United States Patent [19]
Saito et al.

[11] Patent Number: 5,429,902
[45] Date of Patent: Jul. 4, 1995

[54] ELECTROPHOTOGRAPHIC TONER COMPOSITION AND IMAGE FORMATION METHOD USING THE SAME

[75] Inventors: Susumu Saito; Takashi Imai; Masayuki Kurimoto; Hideyuki Akagi, all of Minami Ashigara, Japan

[73] Assignee: Fuji Xerox Co., Ltd., Tokyo, Japan

[21] Appl. No.: 150,801

[22] Filed: Nov. 12, 1993

[30] Foreign Application Priority Data

Nov. 20, 1992 [JP] Japan ............... 4-333880
Aug. 20, 1993 [JP] Japan ............... 5-226606

[51] Int. Cl.⁶ ............................................ G03G 9/08
[52] U.S. Cl. ................................... 430/110; 430/109
[58] Field of Search ................... 430/106, 110, 109

[56] References Cited

U.S. PATENT DOCUMENTS

| | | | |
|---|---|---|---|
| 3,983,045 | 9/1976 | Jugle et al. | 430/110 |
| 5,155,000 | 10/1992 | Matsumura et al. | 430/106 |

FOREIGN PATENT DOCUMENTS

| | | |
|---|---|---|
| 52-30437 | 3/1977 | Japan . |
| 52-135739 | 11/1977 | Japan . |
| 56-123550 | 9/1981 | Japan . |
| 57-79961 | 5/1982 | Japan . |
| 58-216252 | 12/1983 | Japan . |
| 59-52255 | 3/1984 | Japan . |
| 60-93455 | 5/1985 | Japan . |
| 60-112052 | 6/1985 | Japan . |
| 60-238847 | 11/1985 | Japan . |
| 63-73271 | 4/1988 | Japan . |
| 63-73272 | 4/1988 | Japan . |
| 63-208881 | 8/1988 | Japan . |
| 64-73365 | 3/1989 | Japan . |
| 1-179578 | 7/1989 | Japan . |
| 4-40467 | 2/1992 | Japan . |
| 4-348354 | 12/1992 | Japan . |

*Primary Examiner*—John Goodrow
*Attorney, Agent, or Firm*—Oliff & Berridge

[57] ABSTRACT

An electrophotographic toner composition comprising toner particles containing at least a colorant, a binder resin and an additive, and an image formation method using the toner composition are disclosed, wherein said additive is an additive prepared by surface-treating titanium dioxide fine particles having less than 0.2% by weight of a water-soluble content with a surface treating agent by a wet process. The toner composition is excellent in chargeability, environmental stability of charging, toner admixing properties, and durability. The toner composition hardly adheres to a contact charging member and, even if it does, it causes no reduction in charging performance of the contact charging member and provides a satisfactory image.

11 Claims, 1 Drawing Sheet

ELECTROPHOTOGRAPHIC TONER COMPOSITION AND IMAGE FORMATION METHOD USING THE SAME

FIELD OF THE INVENTION

The present invention relates to an electrophotographic toner composition for development of an electrostatic latent image in electrophotography or electrostatic recording. The present invention also relates to a method for image formation using the toner composition.

BACKGROUND OF THE INVENTION

Generally employed electrophotographic developers for visualizing an electrostatic latent image formed on an electrophotographic photoreceptor include one-component developers comprising a toner prepared by melt-kneading a binder resin, such as polystyrene, a styrene-butadiene copolymer or polyester, and a colorant or a dye, e.g., carbon black or Phthalocyanine Blue, followed by grinding and two-component developers composed of the toner and a carrier having approximately the same particle size as the toner or a particle size of up to 500 μm, such as glass beads, iron particles, nickel particles, ferrite particles, etc. which may be coated with a resin.

When used as such, these developers are insufficient in performance properties, such as preservability (anti-blocking properties), fluidity, developing properties, transfer properties, and charging properties, Therefore, external additives for improving these characteristics are often added to the toner. External additives proposed to date include hydrophobic silica fine powder (see JP-A-52-30437, the term "JP-A" as used herein means an "unexamined published Japanese patent application"), silica fine powder combined with aluminum oxide or titanium dioxide fine powder (see JP-A-60-238847), gas-phase-processed titanium dioxide having been rendered hydrophobic (see JP-A-59-52255), anatase titanium dioxide (see JP-A-60-112052), and aluminum oxide-coated titanium dioxide (see JP-A-57-79961). It has also been suggested to subject an inorganic compound proposed as an external additive to a surface treatment as exemplified by titanium dioxide fine particles having been surface-treated with a coupling agent as disclosed in JP-A-4-40467 and JP-A-4-348354.

Electrophotographic image formation basically consists of charging of a photoreceptor made of, for example, selenium, cadmium sulfide, zinc oxide, amorphous silicon, an organic photoconductor, etc., exposure to light, development, transfer, fixing, and cleaning. Of these processes, the conventional charging process is mostly carried out by applying a high voltage (DC 5 to 8 kV) to a metallic wire(s) to induce a corona discharge. The corona discharge involves the following disadvantages. Corona discharge products, such as ozone and $NO_x$, denature the surface of a photoreceptor to cause image blurs or deterioration of the photoreceptor, and contamination of the wire gives adverse influences on image quality, causing image defects, such as white spots or black streaks. Further, a corona discharger is of low efficiency because most of the corona current passes through a grounding shielding plate with only 5 to 30% of the corona current being supplied to a photoreceptor.

In order to overcome these problems associated with corona discharge, the latest studies have been directed to contact charge using no corona discharger as described in JP-A-63-208881, JP-A-1-179578 and JP-A-64-73365. The charging process by contact charge is carried out by applying a direct voltage ($V_{DC}$) and an alternating voltage ($V_{AC}$) to a charging member, e.g., a conductive elastic roller, and bringing the charging member with an applied pulsating current ($V_{DC}+V_{AC}$) into contact with the surface of a photoreceptor to uniformly charge the photoreceptor to a prescribed potential.

Addition of a hydrophobic fine powder, such as silica fine powder, which is often used as an external additive to a toner, achieves considerable improvements in preservability, fluidity, developing properties, transfer properties, and the like. However, the hydrophobic fine powder, when added in an amount sufficient to exhibit desired improvements, adversely affects the charging properties of the toner. That is, of various charging properties required including quantity of charge, charging speed, distribution of charge, toner admixing properties, and environmental stability of charging, the charging speed, charge distribution, toner admixing properties, and environmental charging stability are adversely influenced by addition of silica, etc.

On the other hand, the combined use of alumina or titanium dioxide fine particles with silica fine powder in an attempt to improve the charging speed, charge distribution, toner admixing properties, and environmental charging stability gives rise to a problem that the quantity of charge attained is appreciably reduced. Moreover, the tolerance of a toner for these additives for satisfying the above-mentioned various charging properties is very narrow, and the achieved improving effects are not sufficient. In particular, environmental stability of charge quantity is still inferior.

Since the conventional gas-phase-processed rutile titanium dioxide or anatase titanium dioxide as non-treated are hardly charged, they must be coated with, e.g., alumina, or made hydrophobic by treating with a coupling agent for use as an additive for a toner. However, alumina-treated titanium dioxide particles are not always prevented effectively from agglomeration, and also their dispersibility in toner particles is unsatisfactory. Further, coupling agent-treated hydrophobic titanium dioxide particles are effective to some extent to improve charging properties but still insufficient.

While hydrophobic additives are generally prepared by a surface treatment with a silane coupling agent, those in which a hydroxyl group on the surface of silica particles is reacted with a silanol group derived from a silane coupling agent do not have sufficient hydrophobic nature and still need improvements in rise, uniformity and stability of charge and toner fluidity.

It is also known to effect charging by making use of the polarity of the treating agents. For example, a toner containing an aminosilane-treated metal oxide powder exhibits strong positive chargeability as disclosed in JP-A-52-135739 and JP-A-56-123550. However, aminosilane, being hydrophilic, aminosilane causes changes of toner fluidity or chargeability with time under a high temperature and high humidity condition.

Toners containing both aminosilane and a metal oxide powder having been rendered hydrophobic are proposed in JP-A-58-216252, JP-A-63-73271, and JP-A-63-73272, but they need improvements in rise and stability of charge and toner fluidity.

JP-A-60-93455 teaches a method for obtaining a negatively chargeable toner, in which an inorganic fine powder is surface-treated with a fluorine-substituted silane coupling agent having a negative polar group so that the chargeability of the polar group present on the surface of the inorganic fine powder is utilized for increasing the charge level of the toner. According to this technique, the resulting toner surely secures an increased charge level but is still unsatisfactory in terms of rise and stability of charge and toner fluidity. The publication refers to the particular case of obtaining negative chargeability by using no charge control agent or by using a reduced amount of a polyester resin as a binder resin of toner particles because the polyester resin per se possesses negative chargeability. Nevertheless, such a toner has a disadvantage of large dependence of chargeability on the environment, i.e., a great difference in quantity of charge between a high temperature and high humidity condition and a low temperature and low humidity condition. The disadvantage is especially conspicuous when a pigment other than carbon black is used as a colorant.

While not clear, the negative chargeability of a polyester resin seems attributed to the polar carbonyl ester group thereof. The chargeability of this polar group is susceptible to influences of changes in temperature and humidity, and the same applies where a polyester resin is used in a toner. Further, even if a charge control agent be added to a polyester resin, such cannot bring about any appreciable effect of reducing the variation of chargeability with changes in temperature and humidity. Thus, conventional toners containing a polyester resin as a binder resin fail to satisfy the requirements, such as environmental stability of charging properties.

On the other hand, where the above-mentioned contact charge is applied to electrophotography using a conventional toner composition, it turned out that residual trace amounts of toner particles and a released external additive, etc. on a photoreceptor after cleaning are deposited on the contact charging member, ultimately resulting in occurrence of image defects.

SUMMARY OF THE INVENTION

An object of the present invention is to provide an electrophotographic toner composition excellent in chargeability, environmental charging stability, toner admixing properties, durability, and the like.

Another object of the present invention is to provide an electrophotographic toner composition which is hardly deposited on a contact charging member and maintains satisfactory image quality.

A further object of the present invention is to provide an electrophotographic toner composition which, even if deposited on a contact charging member, does not cause reductions in charging performance of the member.

A still further object of the present invention is to provide a method for electrophotographically forming an image using the above-described toner composition.

The present inventors have conducted extensive investigations on an electrophotographic toner composition with which a satisfactory image can be formed while overcoming the disadvantages associated with the conventional electrophotographic techniques. As a result, they have found that the above objects are accomplished by using an external additive obtained by surface-treating titanium dioxide having a water-soluble content below a certain level. The present invention has been completed based on this finding.

The present invention relates to an electrophotographic toner composition comprising toner particles containing at least a colorant and a binder resin and an additive, wherein said additive is an additive prepared by surface-treating titanium dioxide fine particles having less than 0.2% by weight of a water-soluble content by a wet process.

The present invention also relates to a method for forming an image comprising a charging process in which a carrier for a latent image (hereinafter referred to as a photoreceptor) is charged, a latent image forming process in which an electrostatic latent image is formed on the charged photoreceptor, and a developing process in which the electrostatic latent image is developed with an electrophotographic toner composition, wherein said electrophotographic toner composition comprises toner particles containing at least a colorant and a binder resin and an additive, in which said additive is an additive prepared by surface-treating titanium dioxide fine particles having less than 0.2% by weight of a water-soluble-content by a wet process.

In another preferred embodiment of the present invention, the surface treatment of titanium dioxide fine particles is carried out by using a combination of a surface treating agent having a positive polar group and a surface treating agent having a negative polar group.

In a still another preferred embodiment of the present invention, the titanium dioxide fine particles to be surface-treated have a shorter axial length to longer axial length (hereinafter referred to as an aspect ratio) of not less than 2.

DETAILED DESCRIPTION OF THE INVENTION

Typical examples of the colorants which constitute the toner particles of the present invention include pigments, such as carbon black, Nigrosine, Aniline Blue, Chalcoyl Blue, Chrome Yellow, Ultramarine Blue, Du Pont Oil Red, Quinoline Yellow, Methylene Blue chloride, Phthalocyanine Blue, Malachite Green oxalate, lamp black, Rose Bengale, C.I. Pigment Red 48:1, C.I. Pigment Red 122, C.I. Pigment Red 57:1, C.I. Pigment Yellow 97, C.I. Pigment Yellow 12, C.I. Pigment Blue 15:1, and C.I. Pigment Blue 15:3.

Examples of the binder resins which constitute the toner particles of the present invention include homo- or copolymers of styrene or derivatives thereof, e.g., chlorostyrene; monoolefins, e.g., ethylene, propylene, butylene, and pentylene; dienes, e.g., butadiene and isoprene; vinyl esters, e.g., vinyl acetate, vinyl propionate, vinyl butyrate, and vinyl benzoate; α-methylene aliphatic monocarboxylic acid esters, e.g., methyl acrylate, ethyl acrylate, butyl acrylate, octyl acrylate, dodecyl acrylate, phenyl acrylate, methyl methacrylate, ethyl methacrylate, butyl methacrylate, and dodecyl methacrylate; vinyl ethers, e.g., vinyl methyl ether, vinyl ethyl ether, and vinyl butyl ether; and vinyl ketones, e.g., vinyl methyl ketone, vinyl hexyl ketone, and vinyl isopropenyl ketone.

Specific examples of these binder resins are polystyrene resins, styrene-alkyl acrylate copolymers, styrene-alkyl methacrylate copolymers, styrene-acrylonitrile copolymers, styrene-butadiene copolymers, styrene-maleic anhydride copolymers, polyethylene resins, and polypropylene resins. Additionally, polyester resins, polyurethane resins, epoxy resins, silicone resins, polyamide resins, modified rosin, paraffins, and waxes are also employable.

Of these binder resins, polyester resins are particularly effective. The polyester resins can be prepared by reacting a polyhydroxy compound and a polybasic carboxylic acid or a reactive derivative thereof.

Examples of the polyhydroxy compound include diols, e.g., ethylene glycol, diethylene glycol, triethylene glycol, 1,2-propylene glycol, 1,3-propylene glycol, 1,4-butanediol, and neopentylene glycol; hydrogenated bisphenol A; alkylene oxide adducts of bisphenol A, e.g., polyoxyethylene-added bisphenol A and polyoxypropylene-added bisphenol A; and other dihydric alcohols and dihydric phenols (e.g., bisphenol A).

Examples of the polybasic carboxylic acid include malonic acid, succinic acid, adipic acid, sebacic acid, an alkylsuccinic acid, maleic acid, fumaric acid, mesaconic acid, citraconic acid, itaconic acid, glutaconic acid, cyclohexanedicarboxylic acid, phthalic acid, terephthalic acid, isophthalic acid, and other dicarboxylic acids, and reactive derivatives thereof, such as anhydrides, alkyl esters, acid halides, etc.

These polybasic carboxylic acids may be used in combination with a tri- or higher polyhydroxy compound and/or a tri- or higher polybasic carboxylic acid so as to make the resulting polymer non-linear to such an extent that no tetrahydrofuran-insoluble content may occur.

The tri- or higher polyhydroxy compound and the tri- or higher polybasic carboxylic acid are preferably used in an amount of not more than 30 mol % of the total amount of acids used.

Examples of such a polyhydroxy compound are sorbitol, 1,2,3,6-hexanetetrol, 1,4-sorbitan, pentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trimethylolbenzene.

Examples of such a polybasic carboxylic acid are 1,2,4-benzenetricarboxylic acid, 1,2,4-benzenetricarboxylic acid, 1,2,5-benzenetricarboxylic acid, 1,2,4-cyclohexanetricarboxylic acid, and 2,5,7-naphthalenetricarboxylic acid.

Preferred of the polyester resins prepared from the above-mentioned starting materials are linear polyester resins obtained by polycondensation of bisphenol A and an aromatic polybasic carboxylic acid as main monomer components.

The polyester resins which are particularly preferred in the present invention are those having a softening point of from 90° to 150° C., a glass transition point of from 50° to 70° C., a number average molecular weight of from 2000 to 6000, a weight average molecular weight of from 8000 to 15000, an acid value of from 5 to 30, and a hydroxyl value of from 5 to 40.

The toner particles preferably contain from 1 to 8 parts by weight of a colorant per 100 parts by weight of a binder resin. If the amount of the colorant is less than 1 part, the toner tends to have an insufficient coloring power. If it exceeds 8 parts, the toner tends to have reduced transparency.

The toner particles have an average particle size of not greater than 30 μm, and preferably from 5 to 20 μm.

If desired, additives other than the surface-treated titanium dioxide according to the present invention, such as a charge control agent, a fixing aid, a fluidity improving agent, a parting agent, a cleaning aid, and so forth, may be added to the toner particles.

The external additive according to the present invention is titanium dioxide with a water-soluble content of less than 0.2% by weight which has been subjected to a surface treatment by a wet process.

The lower limit of the water-soluble content of titanium dioxide is 0. The water-soluble content of titanium dioxide is preferably from 0.01 to 0.15% by weight.

The titanium dioxide to be surface-treated is prepared by a wet process consisting of a chemical reaction in a solvent. The wet process mainly includes a sulfuric acid process and a hydrochloric acid process. According to the sulfuric acid process, the following reactions proceed in a liquid phase to provide insoluble hydrous titanium dioxide:

$$FeTiO_3 + 2H_2SO_4 \rightarrow FeSO_4 + TiOSO_4 + 2H_2O$$

$$TiOSO_4 + 2H_2O \rightarrow TiO(OH)_2 + H_2SO_4$$

According to the hydrochloric acid process, a strong base, such as caustic soda, is poured into a hydrochloric acid aqueous solution of titanium tetrachloride to precipitate titanium hydroxide $(Ti(OH)_4)$. Both hydrous titanium dioxide and titanium hydroxide thus obtained are subjected to calcination to obtain titanium dioxide fine particles.

While titanium dioxide is generally employed as an external additive for electrophotographic toners by which charging stability can be improved over use of silica or alumina, wet-processed titanium dioxide particles as obtained are known to have relatively low chargeability due to much impurity. In this connection, the titanium dioxide to be used in the present invention should have its water-soluble content reduced to a level below 0.2% by weight usually by a washing step.

The washing step is effected in the following manner. Titanium dioxide is added in water (e.g., tap water, exchange water) to form a slurry. A mixing ratio of the titanium dioxide to water ratio is about from 300 to 80 g/l and preferably 200 to 100 g/l. The thus obtained slurry is stirred for 10 to 300 minutes (preferably 30 to 120 minutes) with heating at 40° to 100° C. (preferably 60° to 90° C.) in a stirring apparatus such as a kneader. After, the slurry is sampled to confirm reduction of the water soluble content in the titanium dioxide. The water as a solvent is removed by a filter press. The resulting wet cake under pressure is then washed with clean water (e.g., exchange water, distilled water) and dried, and the thus obtained second agglomerate is pulverized e.g., by a pin mill.

If the water-soluble content is 0.2% or more, the chargeability is low and would not be increased sufficiently even through a surface treatment. Besides, if titanium dioxide particles with a water-soluble content of 0.2% or more adhere to a contact charging member, the charging member loses its function of uniform charging of a photoreceptor, resulting in occurrence of image defects. As far as the water-soluble content is controlled below 0.2%, titanium dioxide attains large quantities of charge and, upon being surface-treated, maintains further increased quantities of charge. The titanium dioxide with the controlled water-soluble content has an increased electric resistivity, and, even if it adheres to a contact charging member, a photoreceptor can be uniformly charged causing no image defects. These advantages resulting from the controlled water-soluble content may be accounted for as follows.

Titanium dioxide is essentially insoluble in water and has no water-soluble component at all. However, the titanium dioxide as produced by a wet process unavoidably contains a residual trace amount of water-soluble components. The residual water-soluble content is assumed to reduce the chargeability of titanium dioxide. It is conventionally believed that charging properties are influenced by the environment of contact charge or the electric resistance of the chargeable material itself. From this viewpoint, it appears that the residual water-soluble content in titanium dioxide powder makes the powder water-absorbent and attractive to water. It would follow that the powder has reduced resistance and thereby reduced chargeability. In other words, removal or reduction of the water-soluble content in titanium dioxide would provide a toner composition with increased resistance and higher chargeability.

The water-soluble components which may be incorporated into titanium dioxide powder include $K^+$, $Na^+$, $Li^+$, $Mg^{2+}$, $PO_4^{2-}$, $SO_4^{2-}$ and $Cl^-$ which are present in conditioning agents or coagulating agents used in the preparation. The water-soluble content arising from these components can be measured by boiling 5 g of titanium dioxide in 250 μml of water, cooling and filtering the solution, evaporating the filtrate (100 ml) to dryness, and weighing the residue. For the details of the measurement, reference can be made to JIS K5116-1973 "Titanium dioxide (pigment)". The term "water-soluble content" as used throughout the specification of the present invention means the value as measured in accordance with the above JIS and expressed in terms of per cent based on the initial weight of titanium dioxide.

The titanium dioxide of the present invention may be any of a rutile or a anatase crystal form, and preferably has a specific gravity of not less than 3.9, and more preferably 4.0 to 4.5.

It is preferable that the titanium dioxide having the thus controlled water-soluble content comprises a rutile structure to a degree of 100% and has a specific surface area of from 50 to 500 m²/g, and particularly from 70 to 200 m²/g, a pH of from 7.0 to 9.0, an electric conductivity of from 20 to 100 μs/cm, and particularly from 30 to 90 μs/cm, a water content of from 0.3 to 7.0% by weight, and particularly from 0.5 to 5.0% by weight, and an ash content of not more than 0.5% by weight, and particularly not more than 0.3% by weight.

The treating agent which can be used for the surface treatment of titanium dioxide fine particles includes those capable of reacting with a hydroxyl group to render the surface of the particles hydrophobic, such as coupling agents, e.g., silane coupling agents, titanate coupling agents, aluminate coupling agents, and zirconium coupling agents; and silicone oils.

It is particularly preferred to use a combination of a surface treating agent having a negative polar group and a surface treating agent having a positive polar group. While each of them exhibits the effect to endow titanium dioxide with excellent charging properties, a combined use of them brings about further improvements in environmental charging stability and toner admixing properties for some unknown reasons, probably because the existence of both a positive polar group and a negative polar group stabilizes the charge attributed to each polar group against changes of the environment.

The coupling agents having a negative polar group include silane coupling agents represented by the following formulae:

wherein x represents an integer of from 1 to 3; R represents a halogen-substituted or unsubstituted alkyl group having from 1 to 16 carbon atoms, preferably a fluoroalkyl group, and more preferably a perfluoroalkyl group; and $OR_1$ represents an alkoxy group, e.g., a methoxy group or an ethoxy group. Preferred of them are halogen-containing ones, especially fluorine type silane coupling agents. These silane coupling agents may be used either individually or in combination thereof.

Specific examples of the above-mentioned silane coupling agents are $CF_3(CH_2)_2SiCl_3$, $CF_3(CF_2)_5SiCl_3$, $CF_3(CH_2)_2Si(OCH_3)_3$, $CF_3(CF_2)_3SiCH_2CH_2OCH_3(OCH_3)_2$, $Cl(CH_2)_3Si(OCH_3)_3$, and $I(CH_2)_3Si(OCH_3)_3$. Those of the above formulae wherein x is 3 are preferred for obtaining an increased quantity of charge.

The coupling agents having a positive polar group include amine type coupling agents represented by the following formulae:

wherein x and $OR_1$ are as defined above; and R' represents a nitrogen-containing alkyl group having from 1 to 16 carbon atoms.

Specific examples of these amine type coupling agents are $H_2N(CH_2)_2NH(CH_2)_3Si(OCH_3)_3$, $H_2N(CH_2)_3Si(OCH_3)_3$, and $H_2N(CH_2)_2NH(CH_2)_2NH(CH_2)_3Si(OCH_3)_3$. Those of the above formulae wherein x is 3 are preferred for obtaining an increased quantity of charge.

Silicone oils having both a positive polar group and a negative polar group may be used in place of a combination of a coupling agent having a negative polar group and a coupling agent having a positive polar group. Examples of such silicone oils include dimethyl silicone, methylphenyl silicone, monomethyl silicone, and a modified silicone oil.

Surface treatment of titanium dioxide powder with the above-mentioned coupling agent can be carried out according to the following procedure. The coupling agent is diluted with a solvent, e.g., tetrahydrofuran, toluene, ethyl acetate, methyl ethyl ketone or acetone, and titanium dioxide fine powder is thoroughly mixed therewith by, for example, dropwise addition or spraying of the diluted coupling agent to titanium dioxide powder under forced stirring by means of a blender, etc. The resulting mixture is transferred to a vat and dried by heating in an oven. The dried mixture is sufficiently pulverized by stirring in a blender or milling in a mortar. Where two or more coupling agents are used, the treatments may be conducted either separately or simultaneously. Besides the above-described dry process, the surface treatment may be effected in a wet process, in which titanium dioxide fine powder is immersed in an organic solvent solution of the coupling agent followed by drying, or titanium dioxide fine powder is dispersed in water, an aqueous solution of the coupling agent is added dropwise to the resulting titanium dioxide slurry, and the sedimented titanium dioxide fine powder is heat-dried followed by pulverization.

The treatment agents, inclusive of the agent having a positive polar group and the one having a negative polar group, are used in a total amount of from 0.1 to 25% by weight, and preferably from 5 to 20% by weight, based on the titanium dioxide fine particles. If the amount of the treating agents is less than 0.1%, the surface-treating effects obtained tend to be insufficient only to provide a toner composition with low chargeability. If it exceeds 25%, the treating agents used tend to precipitate, making the treatment difficult.

The agent having a positive polar group is preferably used in an amount of 1 to 20% by weight of the total surface treating agent.

The titanium dioxide fine particles having a water-soluble content of less than 0.2% by weight have an average particle size of not greater than 1 μm, and preferably from 5 to 100 nm. The particles preferably have an aspect ratio of not less than 2. The aspect ratio is determined by measuring the shorter and longer axial length of the titanium dioxide fine particles which are fixed with resins by TEM (transmission electron. microscope). Such acicular particles, when externally adhered to toner particles, hardly move from the surface of the toner particles to a photoreceptor or a charging member. As a result, contamination of the photoreceptor or the charging member can be markedly inhibited to thereby afford a satisfactory image in a stable manner for an extended period of time.

It is preferable that the surface-treated titanium dioxide fine particles have a specific surface area of from 30 to 300 m$^2$/g, and more preferably from 40 to 100 m$^2$/g, and a pH between 7.0 and 9.0, and exhibit a methanol wettability of from 50 to 90%, and more preferably from 60 to 80%, against methyl alcohol. - The surface-treated titanium dioxide fine particles are added to toner particles in a proportion of from 0.1 to 5% by weight, and preferably from 0.5 to 3% by weight, based on the toner particles. If desired, other known additives, such as silica or alumina, may be used in combination with the titanium dioxide fine particles of the present invention.

Toner particles can be prepared by melt-kneading a colorant and a binder resin and grinding the blend, followed by classification. Polymerization processes, such as suspension polymerization, dispersion-emulsion polymerization, and encapsulation, are also applicable.

Adhesion of the external additive(s) onto the surface to toner particles is performed by mixing them by means of, for example, a high-speed mixing apparatus, such as a Henschel mixer or a twin-cylinder mixer.

The electrophotographic toner composition of the present invention includes one-component developers containing no carrier and two-component developers containing a carrier, with the latter being preferred.

Carriers which can be used in the two-component developers are not particularly limited, and any known carriers, such as an iron powder type carrier, a ferrite type carrier, a surface-coated ferrite carrier, and a magnetic powder-dispersed carrier, may be employed.

According to the present invention, in which surface-treated titanium dioxide having a water-soluble content of less than 0.2% by weight is externally added to toner particles, the surface of toner particles is charged with improved uniformity and accelerated exchange of charges among toner particles thereby to increase the speed of charging and to provide a sharp charge distribution while maintaining sufficient chargeability necessary for development even in a high temperature and high humidity condition. As a result, the toner composition exhibits significantly reduced dependence of chargeability upon environmental conditions.

Where, in particular, a polyester resin is used as a binder resin, the above-mentioned disadvantages associated with the negative chargeability of a polyester resin with respect to environment dependence of chargeability can be eliminated.

Figure 1:
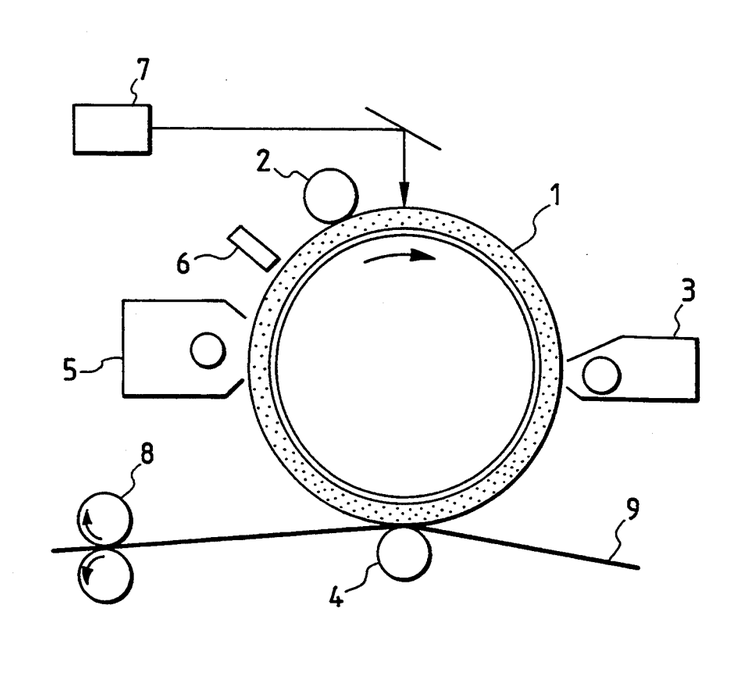
FIG. 1 shows a cross sectional view of an electrophotographic image formation apparatus using the electrophotographic toner composition according to the present invention.

The image formation method according to the present invention will be explained by way of an illustrative embodiment with reference to the apparatus shown in FIG. 1. In FIG. 1, charging member 2 (e.g., conductive elastic roll) is in contact with photoreceptor 1. On the periphery of photoreceptor 1 are clockwise provided developing member 3 which functions as a container of a toner composition and also as a toner feeder, transfer charging member 4, cleaner 5, and antistatic member 6 in this order. Light source 7, e.g., a laser, for exposure is placed above photoreceptor 1. A pair of fixing rolls 8 each containing therein an internal heat source are provided by the side of transfer member 4. Numeral 9 is a sheet of transfer paper.

The image formation method of the present invention consists of a charging process in which the surface of photoreceptor 1 is charged by charging member 2 which is preferably charged by superimposing a direct current and an alternating current, a latent image forming process in which photoreceptor 1 is exposed to light by irradiation of a laser beam from light source 7 to form an electrostatic latent image, and a developing process in which the electrostatic latent image is visualized by developing member 3 to form a toner image. The toner image on photoreceptor 1 is pressed onto transfer paper 9 while passing between photoreceptor 1 and transfer charging member 4 and fixed thereon while passing through heated fixing rolls 8. The toner remaining on the surface of photoreceptor 1 is removed by cleaner 5 with a blade. If necessary, the slight quantity of residual charge on the photoreceptor is removed by antistatic member 6.

The present invention will now be illustrated in greater detail with reference to Examples, but the present invention should not be construed as being limited thereto. All the percents, parts, and ratios are by weight unless otherwise indicated.

EXAMPLE 1 AND COMPARATIVE EXAMPLE 1

Preparation of Toner Particles:

| 1-1) Toner a: | |
| --- | --- |
| Styrene-n-butyl methacrylate (70:30) copolymer (glass transition point (Tg): 65° C.: number average molecular weight (Mn): 15,000; weight average molecular weight (Mw): 35,000) | 100 parts |
| Magenta pigment (C.I. Pigment Red 57) | 3 parts |

-continued

| 1-1) Toner a: | |
|---|---|
| Potassium tetraphenylborate | 1 part |

The above components were kneaded in an extruder, ground in a jet mill, and classified in an air classifier to obtain magenta toner particles having an average particle diameter $d_{50}$ of 12 μm (designated toner a).

| 1-2) Toner b: | |
|---|---|
| Linear polyester resin (terephthalic acid-bisphenol A ethylene oxide adduct-cyclohexanedimethanol polycondensate; Tg: 62° C.; Mn: 4,000; Mw: 35,000; acid value: 12; hydroxyl value: 25) | 100 parts |
| Magenta pigment (C.I. Pigment Red 57) | 3 parts |

Magenta toner b was obtained from the above components in the same manner as for toner a.

2) Preparation of Additives: In the preparation of additives a to c, e and f, titanium dioxide fine powder having an average particle diameter of 15 nm and a water-soluble content of 0.30% which was prepared by a sulfuric acid wet process ("MT-150A" produced by Teika K.K.; water-soluble content: 0.30%) was used.

2-1) Additive a

Ten grams of titanium dioxide fine powder having been washed with water to reduce its water-soluble content to 0.11% were dispersed in a 95:5 methanol/water mixed solvent having dissolved therein 1.0 g of methyltrimethoxysilane by ultrasonic wave application. The solvent such as methanol was removed from the dispersion in an evaporator, and the residue was dried, heat-treated in a drier set at 120° C., and ground in a mortar to obtain methyltrimethoxysilane-treated titanium dioxide (designated additive a).

2-2) Additive b

Ten grams of titanium dioxide powder having been washed with water to reduce its water-soluble content to 0.08% were dispersed in a 95:5 methanol/water mixed solvent having dissolved therein 2.0 g of decyltrimethoxysilane by ultrasonic wave application. The resulting dispersion was worked up in the same manner as for additive a to obtain decyltrimethoxysilane-treated titanium dioxide (designated additive b).

2-3) Additive c

Ten grams of titanium dioxide powder having been washed with water to reduce its water-soluble content to 0.13% were dispersed in toluene having dissolved therein 2.0 g of a silicone oil ("KF 99" produced by Shin-Etsu Chemical Industry Co., Ltd.) by ultrasonic wave application. Toluene in the dispersion was removed in an evaporator, and the residue was dried, heat-treated in a drier set at 140° C., and ground in a mortar to obtain silicone oil-treated titanium dioxide (designated additive c).

2-4) Additive d

Ten grams of titanium dioxide fine powder having a water-soluble content of not more than 0.05% prepared by a hydrochloric acid wet process ("TTO-55" produced by Ishihara Sangyo Kaisha, Ltd.) were dispersed in a 95:5 methanol/water mixed solvent having dissolved therein 1.5 g of decyltrimethoxysilane by ultrasonic wave application. The resulting dispersion was worked up in the same manner as for additive a to obtain decyltrimethoxysilane-treated titanium dioxide (designated additive d).

2-5) Additive e

Decyltrimethoxysilane-treated titanium dioxide was prepared in the same manner as for additive b, except for starting with titanium dioxide fine powder as having a water-soluble content of 0.30% without washing with water.

2-6) Additive f

Titanium dioxide fine powder was washed with water to reduce its water-soluble content to 0.12%. No surface treatment was conducted.

2-7) Additive g

Commercially available surface-treated titanium dioxide ("T 805" produced by Nippon Aerosil Co., Ltd.) was used as additive g. "T 805" is a product prepared from titanium dioxide "P-25" also produced by Nippon Aerosil Co., Ltd. by a dry process comprising reacting vaporized titanium tetrachloride with water.

3) Preparation of Toner Compositions:

3-1) Toner Compositions 1 and 2

A hundred parts of toner a and 1.0 part of additive a or b were mixed in a high-speed mixer to prepare toner composition 1 or 2, respectively.

3-2) Toner Compositions 3 to 6

A hundred parts of toner b and 1.0 part of additive a, b, c or d were mixed in a high-speed mixer to prepare toner composition 3, 4, 5 or 6, respectively.

3-3) Toner Composition 7

A hundred parts of toner b was mixed with 0.8 part of additive a and 0.4 part of silica fine powder ("R 972" produced by Nippon Aerosil Co., Ltd.) in a high-speed mixer to prepare toner composition 7.

3-4) Toner Compositions 8 and 9

A hundred parts of toner a or b and 1.0 part of additive e were mixed at a high speed to obtain toner composition 8 or 9, respectively.

3-5) Toner Composition 10

A hundred parts of toner b and 1.0 part of hydrophobic silica fine powder (R 972) were mixed at a high speed to obtain toner composition 10.

3-6) Toner Composition 11

A hundred parts of toner b and 1.0 part of additive f were mixed at a high speed to obtain toner composition 11.

3-7) Toner Composition 12

A hundred parts of toner b and 1.0 part of additive g were mixed at a high speed to obtain toner composition 12.

4) Preparation of Developers:

Five parts of each of toner compositions 1 to 7 and comparative toner compositions 8 to 12 were added to 100 parts of a styrene-methyl methacrylate (90:10) copolymer-coated ferrite carrier having a particle size of about 50 μm, and the mixture was mixed in a tumbler shaker mixer for 1 minute to obtain developers 1 to 7 and comparative developers 8 to 12, respectively.

Each of developers 1 to 12 was subjected to a copying test using an electrophotographic copying machine "A-Color 630" manufactured by Fuji Xerox Co., Ltd. to determine the quantity of charge, the charge distribution, and the amount of the toner charged to the opposite polarity in a high temperature and high humidity condition (30° C., 85% RH) or a low temperature and low humidity condition (10° C., 15% RH). The quantity of charge was measured through image analysis by CSG (charge spectrography). The charge distribution was obtained from equation:

Charge Distribution = $\{Q(80) - Q(20)\}/Q(50)$ wherein Q(20), Q(50), and Q(80) are 20%, 50% and 80% quantity of charge in the cumulative charge distribution curve.

Further, 100 parts of each developer was mixed with 1.7 parts of the corresponding toner. Five minutes later, the same measurements as described above were made to evaluate toner admixing properties.

The results obtained are shown in Table 1 below.

TABLE 1

| | After 1 min's Mixing | | | | | |
|---|---|---|---|---|---|---|
| | 30° C., 85% RH | | | 10° C., 15% RH | | |
| | Quantity of Charge ($\mu$C/g) | Charge Distribution | Amount of Toner of Opposite Polarity (wt %) | Quantity of Charge ($\mu$C/g) | Charge Distribution | Amount of Toner of Opposite Polarity (wt %) |
| Developer No. | | | | | | |
| 1 | −11.8 | 0.6 | 0 | −14.5 | 0.6 | 0 |
| 2 | −12.0 | 0.5 | 0 | −15.1 | 0.6 | 0 |
| 3 | −14.5 | 0.5 | 0 | −17.5 | 0.6 | 0 |
| 4 | −16.4 | 0.5 | 0 | −18.5 | 0.6 | 0 |
| 5 | −12.0 | 0.5 | 0 | −15.1 | 0.6 | 0 |
| 6 | −14.0 | 0.5 | 0 | −17.3 | 0.6 | 0 |
| 7 | −14.5 | 0.6 | 0 | −19.3 | 0.7 | 0 |
| 8 | −5.7 | 0.5 | 0 | −7.8 | 0.5 | 0 |
| 9 | −6.9 | 0.5 | 0 | −8.8 | 0.5 | 0 |
| 10 | −12.1 | 0.9 | 2 | −26.5 | 1.0 | 11 |
| 11 | −1.2 | 1.0 | 34 | −3.0 | 1.0 | 36 |
| 12 | −11.2 | 1.0 | 0 | −13.0 | 1.0 | 0 |
| Developer | | | | | | |
| 1 | −9.3 | 0.6 | 0 | −12.6 | 0.6 | 0 |
| 2 | −11.5 | 0.6 | 0 | −13.6 | 0.7 | 0 |
| 3 | −11.8 | 0.6 | 0 | −14.3 | 0.6 | 0 |
| 4 | −12.2 | 0.6 | 0 | −14.2 | 0.6 | 0 |
| 5 | −11.5 | 0.6 | 0 | −13.6 | 0.7 | 0 |
| 6 | −11.5 | 0.6 | 0 | −13.4 | 0.7 | 0 |
| 7 | −12.5 | 0.7 | 0 | −16.8 | 0.7 | 0 |
| 8 | −4.5 | 0.6 | 0 | −6.1 | 0.5 | 0 |
| 9 | −5.1 | 0.5 | 0 | −7.1 | 0.5 | 0 |
| 10 | −8.2 | 0.9 | 15 | −21.2 | 1.0 | 13 |
| 11 | −0.3 | 1.5 | 41 | −0.8 | 1.4 | 45 |
| 12 | −9.1 | 0.7 | 5 | −10.6 | 0.7 | 5 |

As is apparent from the results in Table 1, developers 1 to 7 according to the present invention show substantially no change in quantity of charge with the change of the environmental conditions and exhibit a very sharp distribution of charge quantity.

When 10,000 copies were taken using these developers, images were stably obtained in general without undergoing variations in image density or background stains, with the exception that slight contamination of the inside of the copying machine was observed in using developer 5.

To the contrary, in using developers 8 or 9 in which titanium dioxide was subjected to a surface treatment but had a water-soluble content of 0.30%, the quantity of charge was low, and background stains developed from the start of copying.

Developer 10 containing hydrophobic silica as an external additive underwent large variation in charge quantity depending on the environmental conditions, exhibited a broad charge quantity distribution, and made a poor rise of charge when made up for with additional toner particles. As a result, the image density underwent large variations with changes of the environment, and background stains and cloud occurred.

Developer 11 containing titanium dioxide whose water-soluble content had been adjusted to 0.12% but which had not received any surface treatment showed an extremely small charge quantity with a considerably high proportion of oppositely charged toner particles and proved unacceptable for practical use.

Developer 12 containing an external additive prepared by surface-treating dry-processed titanium dioxide showed substantially no change in charge quantity with changes in the environment but caused background stains and cloud when used for taking about 3,000 copies.

EXAMPLE 2

| | |
|---|---|
| Styrene-n-butyl methacrylate (70:30) copolymer (Mn: ca. 7,000; Mw: ca. 40,000) | 97 parts |
| Cyan pigment ($\beta$-type copper phthalocyanine; C.I. Pigment Blue 15:3) | 3 parts |

The above components were melt-kneaded, pulverized, and classified to obtain cyan toner particles having $d_{50}$ of 12 $\mu$m.

A hundred parts of the cyan toner particles and 0.7 part of additive b prepared in Example 1 were mixed in a high-speed mixer to prepare a cyan toner composition. The resulting cyan toner composition exhibited satisfactory fluidity.

Six parts of the cyan toner composition were mixed with 100 parts of a styrene-methyl methacrylate copolymer-coated ferrite carrier having a particle size of about 50 $\mu$m to obtain a developer.

A copying test of the developer was carried out using the same copying machine as used in Example 1 under environmental conditions varying from a high temperature and high humidity condition (30° C., 85% RH) to a low temperature and low humidity condition (10° C., 15% RH). As a result, a satisfactory cyan image having a high density and free from background stains could be obtained from the initial stage. Virtually no change in image quality was observed even when 10,000 copies were consecutively taken.

EXAMPLE 3

Magenta toner particles having an average particle size of 12 $\mu$m were prepared in the same manner as in Example 2, except for replacing the cyan pigment with a magenta pigment (Brilliant Carmine 6BC, C.I. Pigment Red 57).

A hundred parts of the magenta toner particles and 1.0 part of additive b prepared in Example 1 were mixed in a high-speed mixer to prepare a magenta toner composition. The resulting magenta toner composition exhibited satisfactory fluidity.

A magenta developer was prepared in the same manner as in Example 2, except for replacing the cyan toner composition with the above prepared magenta toner composition.

EXAMPLE 4

Yellow toner particles, a yellow toner composition, and then a yellow developer were successively prepared in the same manner as in Example 3, except for replacing the magenta pigment with a yellow pigment (Disazo Yellow, C.I. Pigment Yellow 12). The resulting yellow toner composition exhibited satisfactory fluidity.

A copying test of the developers prepared in Examples 3 and 4 was carried out in the same manner as in Example 2. A satisfactory image of high density and free from background stains was obtained irrespective of the environmental changes. Virtually no change in image quality was observed even when 10,000 copies were consecutively taken.

EXAMPLE 5 AND COMPARATIVE EXAMPLE 2

1) Preparation of Additives:

1-1) Additive h

Titanium dioxide fine powder having an average particle diameter of 15 nm, a longer axial length of 20 nm, and a shorter axial length of 10 nm (aspect ratio: 2) (MT-150A) was washed with water to reduce its water-soluble content to 0.10%. To 100 parts of a 95:5 methanol/water mixed solvent having dissolved therein 20 parts of decyltrimethoxysilane was added 200 parts of the titanium dioxide, and the mixture was dispersed by ultrasonic wave application. The solvent such as methanol was removed from the dispersion in an evaporator, and the residue was air-dried, heat-treated in a drier set at 120° C., and ground in a pin mill to obtain decyltrimethoxysilane-treated titanium dioxide (designated additive h) which was subjected to hydrophobic process by introducing an alkyl group on its surface.

1-2) Additive i

Additive i was prepared in the same manner as for additive h, except for starting with dry-processed amorphous titanium dioxide (P-25) having an aspect ratio of about 1.

1-3) Additive j

Additive j was prepared in the same manner as for additive h, except for starting with titanium dioxide having a water-soluble content of 0.32% and an aspect ratio of 2 (MT-150A) without being subjected to washing with water.

2) Preparation of Toner Compositions:

A hundred parts of toner b prepared in Example 1 and 1.0 part of additive h,i or j were mixed in a high-speed mixer to obtain toner composition 13, 14 or 15, respectively.

3) Preparation of Developers:

Each of toner compositions 13 to 15 was mixed with a carrier in the same manner as in Example 1 to prepare developer 13, 14 or 15, respectively.

Developers 13 to 15 were evaluated by a copying test using a copying machine with a contact charger as follows.

A vulcanizing agent was added to a starting compound consisting of 100 parts of a chloroprene compound, 7 parts of carbon black as conductive particles, and 13 parts of paraffin oil. The resulting compound was vulcanization-molded around a stainless steel mandrel to produce a contact type charging member having an outer diameter of 15 mm. The contact type charging member had a resistivity of $1 \times 10^5$ Ω.

The contact type charging member was fitted to a remodeled machine of printer "FX 4105" manufactured by Fuji Xerox Co., Ltd. in place of the corotron charger. In addition, the developing member of the machine was displaced with a two-component developing member.

Each of developers 13 to 15 was loaded on the thus remodeled machine. After taking 50,000 copies, the inside of the machine was examined, and image quality was evaluated by counting the number of white spots on the solid image area (20 cm × 20 cm) and the number of black spots (magenta color) on the white background. The results obtained are shown in Table 2 below.

TABLE 2

| Developer No. | Number of White Spots | Number of Black spots | Contamination of Machine After Taking 50,000 Copies |
|---|---|---|---|
| 13 | 4 | 3 | slight |
| 14 | 115 | 112 | serious |
| 15 | 118 | 151 | serious |

As is apparent from Table 2, developer 13 according to the present invention provided a satisfactory image having not more than 10 white or black spots after obtaining 50,000 copies. To the contrary, developers 14 and 15 caused more than 100 white spots in the solid area and more than 100 black spots in the background. Moreover, in using these comparative developers, the copying machine suffered from serious contamination after taking 50,000 copies. The images obtained with such a contaminated machine also exhibited background fog.

EXAMPLE 6

1) Preparation of Additives:

In the preparation of additives k to m and o, rutile titanium dioxide having an average particle size of 15 nm prepared by a sulfuric acid process (MT-150A) was used as starting titanium dioxide particles. The titanium dioxide had a water-soluble content of 0.30%.

1-1) Additive k

Eight grams of titanium dioxide fine powder having been washed with water to reduce its water-soluble content to 0.11% were added to a mixed solution of 1.0 g of heptadecafluorodecyltrimethoxysilane having a fluorine atom on each of the 3- to 10-positioned carbon atoms as a coupling agent, 0.1 g of γ-aminopropyltriethoxysilane as a coupling agent having an amino group, and 0.5 g of hexamethyldisilazane in 10 g of tetrahydrofuran, and the mixture was stirred in a high-speed mixer. The solvent was removed by distillation in an evaporator, and the residue was heated in a high-temperature tank of 150° C. and ground in a mortar to prepare additive k.

1-2) Additive l

Thirty grams of titanium dioxide fine powder having been washed with water to reduce its water-soluble content of 0.08% were added to a mixed solution of 2 g of tridecafluorooctyltrimethoxysilane having a fluorine atom on each of the 3- to 8-positioned carbon atoms as a coupling agent, 0.5 g of γ-aminopropyltriethoxysilane as a coupling agent having an amino group, and 3 g of dimethyldimethoxysilane in 10 g of tetrahydrofuran, and the mixture was worked-up in the same manner as for additive k to obtain additive l.

1-3) Additive m

Thirty grams of titanium dioxide fine powder having been washed with water to reduce its water-soluble content of 0.13% were added to a mixed solution of 2.5 g of 3,3,3-trifluoropropyltrimethoxysilane as a coupling agent having a fluorine atom, 0.1 g of N-(β-aminoethyl)-γ-aminopropyltriethoxysilane as a coupling agent having an amino group, and 2.5 g of hexamethyldisilazane in 12 g of tetrahydrofuran, and the mixture was worked-up in the same manner as for additive k to obtain additive m.

1-4) Additive n

Thirty grams of titanium dioxide fine powder having a water-soluble content of not more than 0.14% which was prepared by a hydrochloric acid wet process (TTO-55) were added to a mixed solution of 2.5 g of 3,3,3-trifluoropropyltrimethoxysilane as a coupling agent having a fluorine atom, 0.1 g of N-(β-aminoethyl)-γ-aminopropyltriethoxysilane as a coupling agent having an amino group, and 2.5 g of hexamethyldisilazane in 12 g of tetrahydrofuran, and the mixture was worked-up in the same manner as for additive k to obtain additive n.

1-5) Additive o

Ten grams of titanium dioxide fine powder having been washed with water to reduce its water-soluble content of 0.13% were dispersed in a 95:5 methanol/water mixed solvent having dissolved therein 1.0 g of methyltrimethoxysilane by ultrasonic wave application. The solvent such as methanol was removed from the dispersion in an evaporator, and the residue was dried, heat-treated in a drier set at 120° C., and ground in a mortar to obtain additive o.

2) Preparation of Toner Compositions:

2-1) Toner Compositions 16 and 17

A hundred parts of toner a prepared in Example 1 and 1.0 part of additive k or l were mixed in a high-speed mixture to obtain toner composition 16 or 17, respectively.

2-2) Toner Compositions 18 to 21

A hundred parts of toner b prepared in Example 1 and 1.0 part of additive k, l, m or n were mixed in a high-speed mixture to obtain toner compositions 18 to 21, respectively.

2-3) Toner Composition 22

A hundred parts of toner b were mixed with 0.8 part of additive k and 0.4 part of silica fine powder (R 972) in a high-speed mixture to obtain toner composition 22.

2-4) Toner Composition 23

A hundred parts of toner b and 1.0 part of additive o were mixed in a high-speed mixer to obtain toner composition 23.

3) Preparation of Developers:

Developers 16 to 23 were prepared in the same manner as in Example 1, except for using toner compositions 16 to 23.

A copying test of developers 16 to 23 was carried out in the same manner as in Example 1. The results obtained are shown in Table 3 below. For the sake of comparison, the test results using developers 10 and 12 are also shown.

TABLE 3

| | After 1 min's Mixing | | | | | |
|---|---|---|---|---|---|---|
| | 30° C., 85% RH | | | 10° C., 15% RH | | |
| Developer | Quantity of Charge ($\mu$C/g) | Charge Distribution | Amount of Toner of Opposite Polarity (wt %) | Quantity of Charge ($\mu$C/g) | Charge Distribution | Amount of Toner of Opposite Polarity (wt %) |
| 16 | −12.8 | 0.5 | 0 | −14.7 | 0.5 | 0 |
| 17 | −13.1 | 0.5 | 0 | −15.5 | 0.5 | 0 |
| 18 | −14.4 | 0.5 | 0 | −16.4 | 0.5 | 0 |
| 19 | −15.0 | 0.5 | 0 | −15.9 | 0.5 | 0 |
| 20 | −14.2 | 0.5 | 0 | −16.9 | 0.5 | 0 |
| 21 | −12.0 | 0.6 | 0 | −13.8 | 0.6 | 0 |
| 22 | −14.7 | 0.6 | 0 | −19.6 | 0.7 | 0 |
| 23 | −12.0 | 0.5 | 0 | −15.1 | 0.6 | 0 |
| 10 | −12.1 | 0.9 | 2 | −26.5 | 1.0 | 11 |
| 12 | −11.2 | 1.0 | 0 | −13.0 | 1.0 | 0 |
| 16 | −10.1 | 0.6 | 0 | −13.2 | 0.6 | 0 |
| 17 | −13.7 | 0.6 | 0 | −15.7 | 0.6 | 0 |
| 18 | −11.7 | 0.6 | 0 | −13.6 | 0.6 | 0 |
| 19 | −11.2 | 0.6 | 0 | −12.6 | 0.6 | 0 |
| 20 | −13.6 | 0.6 | 0 | −16.6 | 0.6 | 0 |
| 21 | −9.9 | 0.6 | 0 | −11.6 | 0.6 | 0 |
| 22 | −12.7 | 0.7 | 0 | −17.0 | 0.7 | 0 |
| 23 | −11.5 | 0.6 | 0 | −13.6 | 0.7 | 0 |
| 10 | −8.2 | 0.9 | 15 | −21.2 | 1.0 | 13 |
| 12 | −9.1 | 0.7 | 5 | −10.6 | 0.7 | 5 |

As is apparent from the results in Table 3, developers 16 to 22 which contain titanium dioxide treated with a surface treating agent having a positive polar group and a surface treating agent having a negative polar group and developer 23 which contains methyltrimethoxysilanetreated titanium dioxide show substantially no change in quantity of charge with the change of the environmental conditions and have a very sharp distribution of charge quantity.

When 20,000 copies were taken using these developers, images were stably obtained in general without undergoing variations in image density or background stains owing to the small changes in charge quantity and a narrow charge distribution, with the exception that, in the case of using developers 21 and 22, slight contamination of the inside of the copying machine was observed and, in the case of using developer 23, the image density was slightly reduced when 20,000 copies were made due to the slightly broad charge distribution.

On the other hand, in using developer 10 containing hydrophobic silica as an external additive for toner particles underwent large variation in charge quantity depending on the environmental conditions, exhibited a broad charge quantity distribution, and made a poor rise of charge when made up for with additional toner particles. As a result, the image density underwent large variations with changes of the environment, and background stains and cloud occurred.

Further, developer 12 containing an external additive prepared by surface-treating dry-processed titanium dioxide showed reduced changes in charge quantity with changes in the environment but caused background stains and cloud when used for taking about 3,000 copies.

EXAMPLE 7

| | |
|---|---|
| Styrene-n-butyl methacrylate (70:30) copolymer (Mn: ca. 7,000; Mw: ca. 40,000) | 97 parts |
| Cyan pigment (β-type copper phthalocyanine; C.I. Pigment Blue 15:3) | 3 parts |

The above components were melt-kneaded, pulverized, and classified to obtain cyan toner particles having $d_{50}$ of 12 $\mu$m.

A hundred parts of the cyan toner particles and 0.7 part of additive l used in Example 6 were mixed in a high-speed mixer to prepare a cyan toner composition.

The resulting cyan toner composition exhibited satisfactory fluidity.

Six parts of the cyan toner composition were mixed with 100 parts of a styrene-methyl methacrylate copolymer-coated ferrite carrier having a particle size of about 50 μm to obtain a developer.

A copying test of the developer was carried out using the same copying machine as used in Example 1 under environmental conditions varying from a high temperature and high humidity condition (30° C., 85% RH) to a low temperature and low humidity condition (10° C., 15% RH). As a result, a satisfactory cyan image having a high density and free from background stains could be obtained from the initial stage. Virtually no change in image quality was observed even when 20,000 copies were consecutively taken.

EXAMPLE 8

Magenta toner particles having an average particle size of 12 μm were prepared in the same manner as in Example 7, except for replacing the cyan pigment with a magenta pigment (Brilliant Carmine 6BC, C.I. Pigment Red 57).

A hundred parts of the magenta toner particles and 1.0 part of additive 1 used in Example 6 were mixed in a high-speed mixer to prepare a magenta toner composition. The resulting magenta toner composition exhibited satisfactory fluidity.

A magenta developer was prepared in the same manner as in Example 7, except for replacing the cyan toner composition with the above prepared magenta toner composition.

EXAMPLE 9

Yellow toner particles, a yellow toner composition, and then a yellow developer were successively prepared in the same manner as in Example 8, except for replacing the magenta pigment with a yellow pigment (Disazo Yellow, C.I. Pigment Yellow 12). The resulting yellow toner composition exhibited satisfactory fluidity.

A copying test of the developers prepared in Examples 8 and 9 was carried out in the same manner as in Example 7. A satisfactory image of high density and free from background stains was obtained irrespective of the environmental changes. Virtually no change in image quality was observed even when 20,000 copies were consecutively taken.

As described and demonstrated above, the electrophotographic toner composition according to the present invention contains an additive prepared by surface-treating titanium dioxide fine particles having a water-soluble content of less than 0.2% by weight. The additive improves charging properties, especially environmental stability, of toner particles and provides a toner composition having a narrow charge distribution over wide environmental conditions from a high temperature and high humidity condition to a low temperature and low humidity condition. Even on continuous use for an extended period of time, the toner composition retains a high level of a charge quantity while suppressing production of oppositely charged toner particles and therefore provide fog-free images with stable image quality.

In particular, where titanium dioxide treated with a combination of a surface treating agent having a positive polar group and a surface treating agent having a negative polar group is used as an external additive, the toner composition exhibits further improved durability, charge stability against the environment, and toner admixing properties.

Further, titanium dioxide fine particles having an aspect ratio of 2 or more hardly move from the surface of toner particles to a photoreceptor or a charging member. As a result, a satisfactory image can be obtained in a stable manner for a long period of time.

While the invention has been described in detail and with reference to specific examples thereof, it will be apparent to one skilled in the art that various changes and modifications can be made therein without departing from the spirit and scope thereof.

What is claimed is:

1. An electrophotographic toner composition comprising toner particles containing at least a colorant, a binder resin and an additive, wherein said additive is an additive prepared by surface-treating wet-processed titanium dioxide fine particles with a surface treating agent, said titanium dioxide fine particles having an average particle size not greater than 1 μm and having less than 0.2% by weight of a water-soluble content.

2. An electrophotographic toner composition as claimed in claim 1, wherein said binder resin is a polyester resin.

3. An electrophotographic toner composition as claimed in claim 1, wherein said surface treating agent is a coupling agent or a silicone oil.

4. An electrophotographic toner composition as claimed in claim 1, wherein said surface treating agent is a combination of a surface treating agent having a positive polar group and a surface treating agent having a negative polar group.

5. An electrophotographic toner composition as claimed in claim 1, wherein said surface treating agent is used in an amount of from 0.1 to 25% by weight based on the titanium dioxide fine particles.

6. An electrophotographic toner composition as claimed in claim 1, wherein said titanium dioxide fine particles have an average particle size of from 5 to 100 nm.

7. An electrophotographic toner composition as claimed in claim 1, wherein said titanium dioxide fine particles have an aspect ratio of not less than 2.

8. A method for forming an image comprising a charging process in which a carrier for a latent image is charged, a latent image forming process in which an electrostatic latent image is formed on the charged carrier for a latent image, and a developing process in which the electrostatic latent image is developed with an electrophotographic toner composition, wherein said electrophotographic toner composition comprises toner particles containing at least a colorant, a binder resin and an additive, in which said additive is an additive prepared by surface-treating wet-processed titanium dioxide fine particles with a surface treating agent, said titanium dioxide fine particles having an average particle size not greater than 1 μm and having an average particle size not greater than 1 μm and having less than 0.2% by weight of a water-soluble content.

9. A method as claimed in claim 8, wherein said charged process is carried out by a charging member in contact with said carrier for a latent image.

10. A method as claimed in claim 8, wherein said charging process is carried out by a charging member which is in contact with said carrier for a latent image and to which a direct current and an alternating current are applied.

11. A method as claimed in claim 8, wherein said titanium dioxide fine particles have an aspect ratio of not less than 2.

* * * * *